United States Patent
Clare et al.

(10) Patent No.: US 7,071,417 B2
(45) Date of Patent: Jul. 4, 2006

(54) OPTICALLY ENCODED GLASS-COATED MICROWIRE

(75) Inventors: Alexis G. Clare, Alfred Station, NY (US); Wesley A. King, Almond, NY (US); William C. LaCourse, Alfred, NY (US); Howard H. Liebermann, Succasunna, NJ (US); James E. O'Keefe, Jr., Westwood, NJ (US)

(73) Assignee: Demodulation, Inc., Westwood, NJ (US)

( * ) Notice: Subject to any disclaimer, the term of this patent is extended or adjusted under 35 U.S.C. 154(b) by 0 days.

(21) Appl. No.: 10/972,549

(22) Filed: Oct. 25, 2004

(65) Prior Publication Data

US 2006/0086528 A1    Apr. 27, 2006

(51) Int. Cl.
*H01B 7/00* (2006.01)
(52) U.S. Cl. .................................. 174/122 G
(58) Field of Classification Search ............ 174/110 A, 174/122 G, 124 GC
See application file for complete search history.

(56) References Cited

U.S. PATENT DOCUMENTS

| | | | | |
|---|---|---|---|---|
| 2,207,579 | A | * | 7/1940 | Leonhard ...................... 156/56 |
| 4,484,184 | A | | 11/1984 | Gregor et al. ............ 340/572.2 |
| 4,501,490 | A | | 2/1985 | Miyamoto et al. ............. 355/55 |
| 4,510,490 | A | | 4/1985 | Anderson, III et al. .. 340/572.1 |

(Continued)

FOREIGN PATENT DOCUMENTS

WO    WO 01/29755 A1    4/2001

OTHER PUBLICATIONS

Chiriac, Horia, *Preparation and Characterization of Glass-Covered Magnetic Wires*, Materials Science and Engineering A304-306 (2001), p. 166-171.

(Continued)

*Primary Examiner*—Chau Nguyen
(74) *Attorney, Agent, or Firm*—Ernest D. Buff & Associates, LLC; Ernest D. Buff; Gordon E. Fish

(57) ABSTRACT

A drawn glass-coated metallic member has a thermal contraction coefficient differential such that the thermal contraction coefficient of the glass is less than that of the metallic member. The thermal contraction coefficient differential is maintained within a predetermined range during drawing. Drawn glass is placed under residual compression, interfacial bonding between said glass and said wire is substantially uniform, and surface cracking and bond breaks between metal and glass are substantially prevented. Optical properties of the glass coated microwire provide a basis for enabling multi-bit encoding capability. Advantageously data encoding is achieved optically, magneto-optically or using a combined magnetic and optical encoding mechanism. The duplex material constitution of the glass coated microwire permits imparting of data thereon by selection and processing of the glass. Data implantation is readily achieved in-line, during an initial drawing operation, or as a separate post-draw process. Reading of data on optically encoded glass coated microwire is readily accomplished by optical or magnetic methodology, or a combination thereof.

10 Claims, 8 Drawing Sheets

U.S. PATENT DOCUMENTS

| | | | |
|---|---|---|---|
| 5,240,066 A | | 8/1993 | Gorynin et al. .............. 164/461 |
| 5,262,593 A | * | 11/1993 | Madry et al. ........... 174/102 R |
| 5,729,201 A | | 3/1998 | Jahnes et al. ............ 340/572.1 |
| 5,756,998 A | * | 5/1998 | Marks et al. ................ 250/324 |
| 5,921,583 A | | 7/1999 | Matsumoto et al. .......... 283/81 |
| 6,267,291 B1 | * | 7/2001 | Blankenship et al. ....... 235/375 |
| 6,270,591 B1 | | 8/2001 | Chiriac et al. .............. 148/300 |

OTHER PUBLICATIONS

Zhukov, A, *Microwires coated by glass: A new family of soft and hard magnetic materials*, J. Mater. Res., vol. 15, No. 10, Oct. 2000.

Hirao, K., *Writing Waveguides and Gratings in Silica and Related Materials by a Femtosecond Laser*, Journal of Non-Crystalline Solids, 239 (1998) pp. 91-95.

Barker, M.F., *Photomachinable Glass-Ceramics of Controlled Thermal Expansion*, Journal of Non-Crystalline Solids 104 (1988), pp. 1-16.

Ben-Yaker, Adela, *Morphology of Femtosecond-Laser-Ablated Borosilicate Glass Surfaces*, Applied Physics Letters, vol. 83, No. 15,(2003), pp. 3030-3032.

Chirsey, D.B., *New Approach to Laser Direct Writing Active and Passive Mesoscopic Circuit Elements*, Applied Surface Science 154-155 (2000) pp. 593-600.

Fitz-Gerald, J.M., *Laser Direct Writing of Phosphor Screens for High-Definition Displays*, Applied Physics Letters, vol. 76, No. 11, (2000) pp. 1386-1388.

Cheng, Y., *Advanced Irradiation Methods of Femtosecond Laser for Embedded Microfabrication of Transparent Materials*, SPIE vol. 4830 (2003) pp. 479-483.

* cited by examiner (a)

(b)

OPTICALLY ENCODED GLASS-COATED MICROWIRE

BACKGROUND OF THE INVENTION

1. Field of the Invention

This invention relates to glass-coated wire; and more particularly, to a glass coated microwire (GCM) that is optically encoded to provide an article having multi-bit data read/write capability.

2. Description of the Prior Art

Electronic Article Surveillance (EAS) systems are used to electronically detect goods that have not been authorized when they are removed from a retailer. The systems comprise a marker attached to the goods and a sensor mechanism. The retailer can neutralize the marker when he wishes to authorize the removal of the goods, for example when the items have been legitimately purchased.

One type of EAS marker, termed harmonic or electromagnetic, is disclosed by U.S. Pat. Nos. 4,484,184 and 5,921,583. Such a marker comprises a plurality of strips or wire segments of ferromagnetic amorphous magnetic material that resonate electromagnetically and thereby generate harmonics in the presence of an incident magnetic field that has a preselected frequency and is applied within an interrogation zone. Generation of harmonics under these conditions provides marker signal identity. An unmagnetized permanent magnet in the vicinity of the resonating plurality of strips or wire segments can be magnetized or demagnetized to inactivate or re-activate said marker.

Another type of marker, described as being acoustomagnetic or magneto-mechanical, is disclosed by U.S. Pat. No. 4,510,490. In this system, a marker is adapted, when energized, to mechanically resonate at preselected frequencies that are provided by an incident magnetic field applied within an interrogation zone. The marker has a plurality of elongated ductile strips of magnetostrictive ferromagnetic material. Each of the strips is disposed adjacent to a ferromagnetic element which, upon bring magnetized, magnetically biases the strips and energizes them to resonate at the preselected frequencies. A substantial change in effective magnetic permeability of the marker at the preselected frequencies provides the marker with signal identity.

The prior art technologies described hereinabove provide a method and means for sensing the presence of an object to which a marker is affixed.

In related technologies, multi-bit rather than single-bit (on/off) markers have been described in the technical and patent literature. For example, a publication by Zhukov et al., J. Mater. Res. 15 No. 10 October (2000), reports on the ability to produce a multi-bit marker when utilizing multiple amorphous glass-coated wire segments, each having a different dimension (length, alloy vs. gross diameter, etc.) or magnetic property (coercive field, etc). A multi-bit marker disclosed by U.S. Pat. No. 5,729,201 to Jahnes describes a similar marker containing multiple wires; but wherein all wires have the same chemistry and geometric dimensions. A permanent magnet bias field element in the vicinity of an array of amorphous metallic wires serves to differentiate the drive field, at which harmonic response is obtained, by way of proximity of each individual wire segment to the permanent magnet bias field element, thereby providing multi-bit capability. PCT patent publication WO 01/29755 A1 to Antonenco et al. describes a multi-wire marker that is capable of multi-bit performance. As with the Jahnes teaching, each of the GCM segments utilized in the construction of the marker have the same chemistry and geometric dimensions. Antonenco et al. disclose arranging the GCMs in a manner similar to stripes in a conventional optical bar code. Information concerning the Antonenco et al. marker is read using a magnetic reading head.

Each of the encoded markers described in the technical and the patent literature requires the use of a plurality of magnetic elements (strips or wire segments). These multiple magnetic elements must be carefully arranged with respect to each other. They increase the size, weight and cost of the marker and, unless accurately positioned thereon, decrease its identifying characteristics.

There remains a need in the art for a glass-coated amorphous or nanocrystalline alloy GCM marker that is lightweight, small, inexpensive to construct and highly reliable in operation. In addition, there has long remained a need for such a GCM marker that can be optically encoded by any number of means. Finally, there exists a long felt need for a GCM marker that is encoded both magnetically and optically, and would provide redundant authentication or complimentary functions, such as anti-theft capability in conjunction with multi-bit authentication.

SUMMARY OF THE INVENTION

The present invention provides a multi-bit encoded glass coated microwire and articles produced therefrom. Also provided by the invention is a process for encoding of the amorphous or nanocrystalline alloy GCM and article. Advantageously, the invention obviates the need for multiple segments of GCM when manufacturing an encoded article such as an EAS marker. Surprisingly, it has been discovered that altering either the ferromagnetic amorphous alloy core or the glass outer layer of a GCM enables production of the GCM, as well as articles having multi-bit encoding capability. This is the case even when the encoded marker comprises a single segment of GCM. Encoding is afforded either magnetically, or optically; or by a combination thereof. This feature provides the additional advantage of enabling either redundant or complementary systems to be operative in even a single segment of GCM. A further advantage provided by the instant invention is that encoding of the GCM and articles containing GCM can be encoded either during their production process, at various stages of downstream conversion, or even in the field by the end user.

Advantageously, glass-coated amorphous or nanocrystalline alloy GCM marker produced in accordance with the invention is lightweight, small, inexpensive to construct and highly reliable in operation. Optical encoding of the GCM is readily accomplished by numerous means. When encoded both magnetically and optically, the glass coated microwire of the invention provides redundant authentication or complimentary functions, such as anti-theft capability in conjunction with multi-bit authentication.

Numerous, highly advantageous uses for glass-coated articles produced in accordance with the present invention are disclosed hereinafter in greater detail.

BRIEF DESCRIPTION OF THE DRAWINGS

The invention will be more fully understood and further advantages will become apparent when reference is had to the following detailed description and the accompanying drawings, in which.

DETAILED DESCRIPTION OF THE INVENTION

Figure 1:
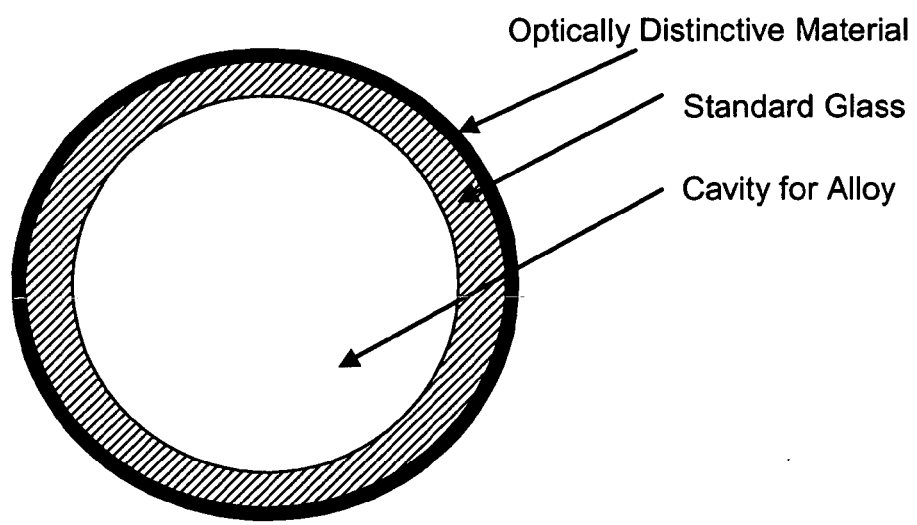
FIG. 1 is a schematic cross-sectional view of a GCM preform showing constituent parts, including a coating at the periphery that is separate and distinct from that of the base GCM.

As used herein, the term "amorphous metallic alloy" means a metallic alloy that substantially lacks any long-range order and is characterized by x-ray diffraction intensity maxima that are qualitatively similar to those observed for liquids or oxide glasses. By way of contrast, the term "nanocrystalline metallic alloy" pertains to those metallic alloys having constituent grain sizes on the order of nanometers (nm).

The term "nanocrystalline alloy", as used herein, means an alloy that has a grain size less than 100 nm. Preferably such an alloy has a grain size ranging from about 10 nm to 100 nm, and most preferably from about 1 nm to 10 nm.

The term "ferromagnetism", as used herein, refers to a phenomenon by which a material can exhibit a net spontaneous magnetization by the self-alignment of constituent magnetic moments.

The term "glass", as used throughout the specification and claims, refers to an inorganic product of fusion that has cooled to the solid state without crystallizing, or to glassy materials formed by chemical means such as a sol-gel process, or by "soot" processes, both of which are used to form glass preforms that are used in fiber optic processing. These materials are not fused; but rather are consolidated at high temperatures, generally below the fusion temperatures of the constituents in question.

The term "preform", as used herein, refers to a vessel in which alloy is melted and subsequently drawn into GCM.

The term "drawing", as used herein, refers to the extension of a material using a tensile force, the extension resulting in a permanent reduction of the material's cross-sectional area.

The term "microwire", as used herein, refers to a thin element, which may be continuous or non-continuous, of circular or non-circular cross-section, and which has a transverse dimension less than about 50 μm, and comprises at least one metallic material.

The term "glass-coated microwire (GCM)", as used herein, refers to a thin element, which may be continuous or non-continuous, of circular or non-circular cross-section, and which has a transverse dimension less than about 50 nm, and comprises at least one metallic material and at least one glassy material.

The term "article", as used herein, refers to a geometric body comprising, at least in part, ferromagnetic amorphous alloy GCM.

The term "bundle", as used herein, refers to a multiplicity of amorphous glass-coated GCMs that are bound together and act as a single element, possibly carrying multi-bit digital data.

The term "multi-bit", as used herein, refers to numerous occurrences of binary (on/off) switching capability.

The term "rare earth", as used herein, refers to any one of a group of closely related metallic elements of atomic number 57 to 71 inclusive.

Glass-coated amorphous and nanocrystalline alloy microwire and its production have been disclosed in the technical and patent literature [see, for example, U.S. Pat. Nos. 6,270,591 and 5,240,066; Horia Chirac, "Preparation and Characterization of Glass Covered Magnetic Wires", *Materials Science and Engineering* A304–306 (2001) pp. 166–171]. Continuous lengths have been produced by melting either a pre-alloyed ingot or the required elemental constituents in a generally vertically disposed glass tube that is sealed at the bottom. Once the alloy is converted to a molten state, using radio frequency ("r.f.") heating for example, the softened bottom of the glass tube is grasped and drawn into continuous microwire. Rapid reduction of alloy cross-section, together with the use of secondary cooling means, causes the alloy to become amorphous or nanocrystalline during drawing.

Ferromagnetic amorphous glass-coated microwires having positive magnetostriction are based on Fe-based alloys. Such Fe-based alloy microwires show outstanding magnetic properties due to their specific magnetic domain structure and magnetoelastic anisotropies. A general attribute of Fe-based alloy microwires is the presence of a large Barkhausen effect, that is, an abrupt jump of the magnetization almost to the saturation value at a certain value of an applied magnetic field, called the switching field. The switching field can be tailored to a particular value over a wide range via the GCM drawing process through the resulting microwire dimensions. In addition, the squareness of the magnetization loop ensures the presence of higher order harmonics, which enables more reliable performance in anti-theft applications, for example. Ferromagnetic amorphous glass-coated microwire having positive magnetostriction has an axially magnetized inner core and a radially magnetized outer shell that result from the magnetoelastic coupling between internal stresses and the positive magnetostriction.

The stress sensitivity of ferromagnetic amorphous glass-coated microwire can be used advantageously as the physical basis for affecting magnetic domain structure. In fact, ferromagnetic amorphous glass-coated microwire encoding can result from a localized alteration of this domain structure. The alteration is readily accomplished by imposition of localized stresses or by selective crystallization of the amorphous alloy. Such changes are affected by a number of means, including localized heating via pulsed laser, chemical thinning of the glass coating, coatings on the glass, and the like. Particularly important for ferromagnetic amorphous glass-coated microwire is the fact that localized modification of the glass coating can be used to effectively produce controlled changes in the magnetic domain structure of the amorphous alloy core in order to enable encoding.

While the outstanding electromagnetic and mechanical properties of amorphous glass-coated microwire (GCM) can be optimized by tailoring the compositions of both core alloy and glass coating and their respective thicknesses, and also through careful process control both during and after the drawing process, the glass coating itself enables one skilled in the art to apply many of the encoding techniques used in optical fibers to GCM. Optically encoding the glass coating provides a means of information storage which can be the primary, a complimentary or a redundant encoding function in relation to any magnetic encoding present. Such functionality can be obtained by exploiting the ability to controllably modify any number of properties of the glass coating, including but not limited to: refractive index, surface reflectivity, transmission, and fluorescence.

The means for detecting or "reading" optically encoding information from glasses is already developed to one degree or another for all of the techniques disclosed herein. Optical detection devices typically consist of a light source of known intensity, polarization, and spectrum and a detector element having known sensitivity to one or more particular wavelengths of light. A further refinement to such a device might include one or more optical filters having intensity, wavelength, polarization or angle dependencies, which allow for increased signal to noise ratio and an improved detection accuracy or reliability. Clearly, device complexity and specificity can be increased through the use of multiple source, filter or detector components to address a particular application. In addition, further sensitivity or accuracy may be obtained by independent or coupled scanning or pulsed operation of the source, the detector, the filter elements or any combination thereof. The fundamental principle underpinning any optical information detection or reading method is that an incoming light signal is modified through its interaction with the glass and that the modification discernible by the detector element. As such, optical detection methods are invariably line-of-sight techniques, whereby the input light signal is directed to the interrogated surface or volume, and the modified, output light signal must then be directed to the detector element.

Amorphous or nanocrystalline microwire technology will have a significant impact in brand protection and antiforgery applications, thereby saving domestic retailers billions of dollars in shrinkage and grey market losses. These products will address a number of homeland/national security needs.

Optical Encoding of GCM for Enhanced EAS, Security and Authentication Applications Information storage can be achieved through optical encoding, which exploits the spectroscopic properties of glass. Optical encoding can be accomplished by harnessing the fluorescent and/or color and refractive properties of glass and will provide an independent and complimentary encoding strategy for achieving multi-functionality GCM.

Optical Encoding Applied to GCM

Uniform Color Methods (Ie. Binary "On/Off", Simple Authentication)

Uniformly colored glass: The glass coating of GCM can possess a specific and identifiable coloration (spectroscopic property). This coloration can be achieved through various methods and can be classified as either intrinsic coloration or light-activated fluorescence.

Intrinsic coloration: The optical properties of a glass are determined by the chemical composition; the base glass components, which determine the major physical and thermal properties, lend a certain base coloration. The optical properties may then be altered significantly through the incorporation of small amounts of specific species called dopants. Dopants are commonly selected from the Rare Earth elements, which are classified as the lanthanides and actinides, respectively, in Periods 6 & 7 of the periodic table of elements. These elements possess partially shielded f-level electrons, resulting in particularly well-defined electronic transitions that cause interesting optical properties of the Rare Earths. Elements from the transition metals (Groups 4–12) also contribute coloration to the glass. Particular combinations of dopant elements can result in a unique spectroscopic signature that is detectable.

Light-activated fluorescence: In addition to its intrinsic optical appearance, a glass might also possess a fluorescent nature. The phenomenon of fluorescence occurs when incident light of a given energy ($E_1$) or wavelength ($\lambda_1$) falls on the glass surface, causing the emission of light of a lower energy ($E_2$) or wavelength ($\lambda_2 > \lambda_1$). Certain components lend a fluorescent quality to the glass, and careful control of glass chemistry will result in a desired fluorescence.

Uniform colored coating: A uniform colored coating, whereby the coloration is achievable through intrinsic coloration or light-activated fluorescence, can also be applied to the exterior of the glass coating on GCM to provide a desired spectroscopic quality. The glass and colored coating must be matched to ensure adequate bonding, which normally requires the glass surface to be treated or functionalized to accept the coating. Such coatings are often of the organic or polymeric type, but they might also consist of a separate layer of glass, being distinguishable somehow from the base glass either by chemistry, properties or both.

Color shifting: Another example of a colored coating is one which shifts either the reflected or transmitted color or both depending upon the angle of observation and/or the angle of incident light. This behavior is sometimes termed "dichroic" and can be caused by a set of optically distinct layers on the glass surface, comprising an interference filter (http://www.techmark.nl/ocj/filters.htm). The layers themselves may consist of inorganic oxides, metallic films or organic films and may be applied singly to the drawn GCM through a variety of methods, including chemical vapor deposition, thermal evaporation, sputtering, dip-coating, and spray-coating. Another method for obtaining the layers is to make a preform already incorporating the desired layer structure in the glass portion and then draw the preform into the GCM. In this case, the layers comprising the components of the filter on the GCM start as concentric, thermo-mechanically similar, optically distinct glass regions in the preform glass tube. A schematic representation is given in FIG. 1.

Another means of obtaining "dichroic" behavior is to add certain components to the glass, for example the rare earths elements Praseodymium and Neodymium. A glass containing these elements as dopants will have a coloration that depends on the wavelength of the light that is used to view the glass.

Multi-bit Optical Encoding

Spatially modified surface color methods ("optical barcode"): Intentional modulation of the detectable coloration of the GCM exterior will allow for the formation of an optical "barcode", retaining stored information that can be retrieved. Three variations on this same theme are presented below, where "color" refers to a particular spectroscopic signature, whether an intrinsic (passive) color or a fluorescent (activated) color, that is distinctive and can be detected. It is presumed that the detection of the optical bar code can be accomplished using currently available equipment (e.g. red laser scanners), or the detection may be tuned to a particular optical frequency or frequencies, providing further security and increasing the difficulty for fraud and counterfeiting.

Figure 2:
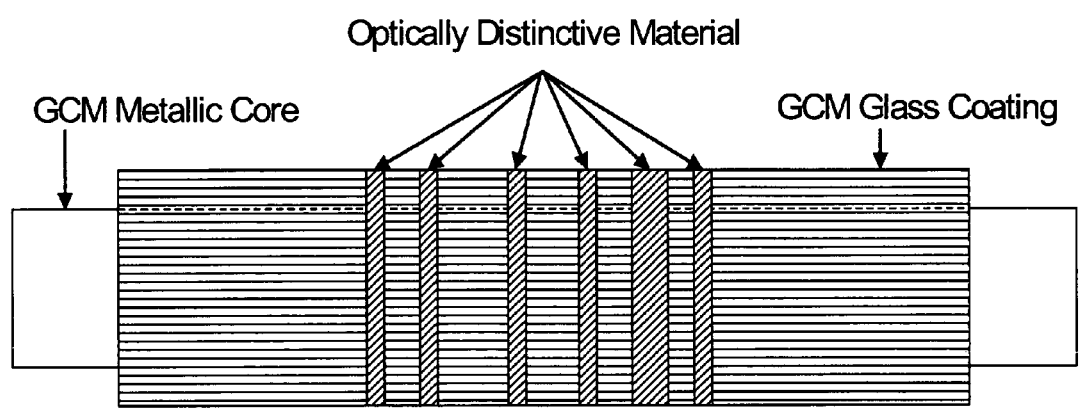
FIG. 2 is a schematic representation of GCM having discrete bands of an optically distinctive material.

Non-colored, opaque coating on colored glass: The coating forms a pattern in which coated regions block the underlying glass color and uncoated regions show the glass color, as depicted schematically in FIG. 2.

Colored coating on non-colored glass: The coating forms a periodic pattern in which coated regions exhibit a detectable coloration and the uncoated regions show the glass, which is a different, unspecific (and not detected) color.

Colored coating on a differently-colored glass: The coating forms a periodic pattern in which coated regions exhibit a particular, detectable coloration and the uncoated regions show the glass, which is has a different, specific detectable coloration. These colors may be detectable in a part of the spectrum that is not visible to the human eye. This method allows for some signal redundancy during detection as the bar code pattern may be determined by scanning for color matching either the outside coating or the underlying glass.

Processes for Optical Encoding

Technique of optical bar code formation: All of the variants described above rely upon forming a spatially modulated coating on the GCM resulting in an optically detectable signal. Optical detection for the bar code forming methods described below can consist of either the normal reflective detection of a scanned laser beam or the comparison of a captured digital image with a database of stored digital images.

Technique 1: High speed printing methods, whereby the coating is in the form of a liquid or powdered ink or toner, can be applied in-line to the external surface of the GCM. The ink can be cured using heat or UV light methods.

Technique 2: Laser-induced modification of a writeable layer present on the outside surface of the GCM. Examples include metallic films, dye-polymer films, bubble forming films, magneto-optical films, and amorphous-to-crystalline phase transition films (U.S. Pat. No. 6,442,296). Upon exposure to the laser light, the reflectivity of the affected film area changes from its initial state, providing a means for spatial differentiation reading Technique 3: A uniform coating is applied to the surface of the GCM, subjected to a curing step, which "fixes" or cures the coating, and the uncured or "unfixed" portion of the coating subsequently is removed. Curing of the coating may be accomplished locally using a laser or a sharply focused, broad spectrum light source or heat source. Further, a combination of a broad spectrum source coupled with a lithographic mask may be used to cure a portion of the "coded" surface or its entirety. This method is a particular variant of the previous method described. Another variant of this method would be the laser-induced removal of portions of the applied film or layer, enabling the formation of an optically readable bar code (http://www.jpsalaser.com/page.asp?page_id=20).

Technique 4: Certain glass compositions are prone to photo-induced structural changes that, with subsequent heat treatment, lead to crystallization (M. F. Barker, P. F. James and R. W. Jones, J. Non-Cryst. Solids, Vol. 104, 1988, 1–16). The photo-induced structural changes alter the appearance for the affected regions, providing one mechanism for forming an optically readable bar code. Furthermore, these affected regions, once crystallized, undergo much faster etching rates compared to the unaltered glass when exposed to the appropriate etchant, for example HF (hydrofluoric acid). Selective crystallization of well-defined spatial regions on the GCM surface, followed by an etching step, could result in a physical pattern of relative depressions on the surface. The contrasting appearance of these regions may enable optical reading, or a substance allowing greater optical contrast could be filled into these depressions thereby facilitating optical detection.

Technique 5: (1) A glass contains a metal oxide component(s) that can be reduced in oxidation state by suitable heat treatment. (2) After the GCM is formed, a metallic film (aluminum, copper, nickel, etc.) is applied to the GCM such that some areas are left uncoated. It is preferable to have a metal coating which is easily removable by etching. (3) The coated GCM is heat-treated in a reducing atmosphere, the hydrogen being unable to diffuse quickly through the metal-coated regions. (4) The hydrogen will cause oxidation state reduction for the heavy metal component in uncoated regions. (5) The metal coating is chemically etched to remove it. (6) The reduced regions will possess an altered optical reflectivity relative to unreduced regions. This modification will in essence result in a permanent, localized removal of the GCM glass coating.

Technique 6: A color-coded pattern may be created by combining several GCM lengths together into an article, said article having a unique and designed optical signature that results from a particular geometric arrangement.

Figure 3:
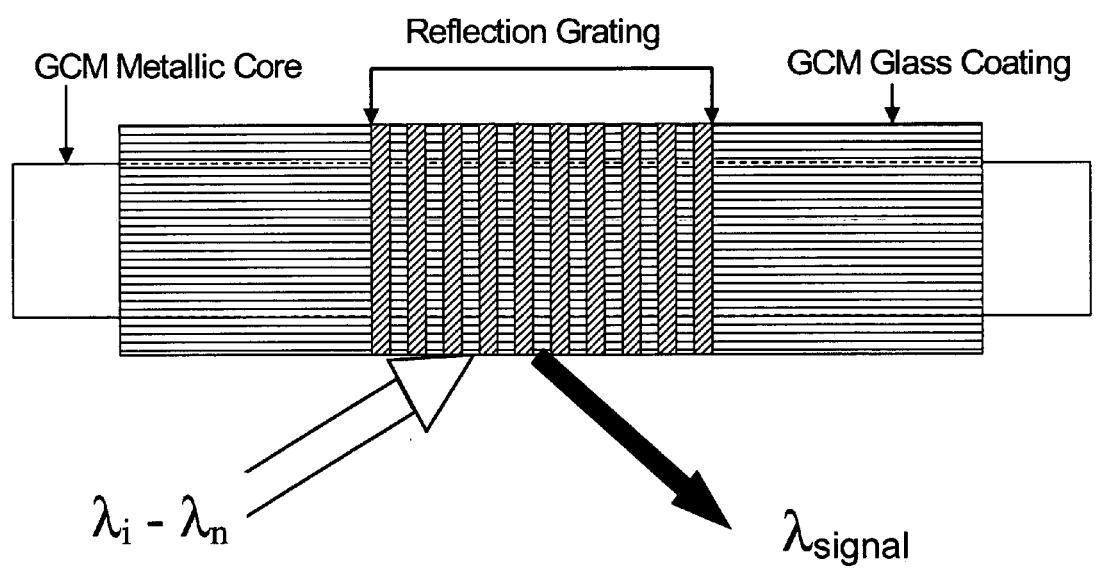
FIG. 3 is a schematic representation of GCM having a reflection grating.

Technique 7: An optical bar code pattern may be formed on the surface of the GCM using the laser direct writing method. See D. B. Chrisey et al., Appl. Surf. Sci. 154–155, 593 (2000); J. M. Fitz-Gerald et al., Appl. Phys. Lett. 76, 1386 (2000). In this method, material is deposited by a beam of a high-repetition-rate, 355-nm ultraviolet (UV) laser, which is focused through a transparent support having a coating that absorbs the laser light on its opposite side. The coating is transferred to the intended substrate and forms an adherent film upon subsequent heat treatment. The heat treatment conditions required will depend upon the material that comprises the film Techniques of Modifying GCM Glass Refractive Index to Result in Refraction Gratings Reflection gratings on the outside surface of the GCM can be used as a further security or authentication feature. The grating structure will cause selective enhanced reflection of a certain wavelength or wavelengths for broadband incident light. This is schematically shown FIG. 3. Owing to the relatively short length needed to make a wavelength-selective grating, it is possible to place several identical gratings in a sequence to provide built-in redundancy, which will reduce the possibility for reading errors.

UV writing of gratings using photosensitivity: Gratings can be created by using a UV laser to induce permanent changes in the refractive index of an illuminated glass region. This is possible because of the interaction between certain glass components and the UV light, which is termed photosensitivity. There are several methods for obtaining these gratings in glass objects, including glass fibers.

Direct laser written (Interference): By interfering two UV lasers, one can obtain an interference pattern of alternating strong and weak intensity regions or fringes. If this fringe pattern is directed onto the side of a GCM, the strong regions of the interference pattern can induce permanent refractive index changes via the photosensitivity of the glass coating. This technique is referred to as side-writing, and the angle at which the two laser beams are combined or interfered directly affects the grating spacing or period, which in turn determines the wavelengths affected by the grating.

Lithography/masking: A second method for side-writing a grating involves use of a single UV laser beam and a mask, which is placed adjacent to the GCM. The mask modulates the laser beam to produce the periodic intensity variation on the GCM glass coating, which in turn creates the grating via the photosensitivity mechanism.

Laser-induced modification (femtosecond-pulsed UV lasers): Very fast UV laser pulses have been shown to cause permanent changes in the refractive index of silica glass. The precise mechanism is still being investigated; however, this method has been used to create 3-D wave guides in solid silica forms. (K. Hirao and K. Miura, J. Non-Cryst. Solids, 239, 1998, pp. 91–95). It is likely this technique can also be used to write gratings in non-telecommunications glass compositions (not high purity silica) that are more normally used for GCM applications. A recent paper has reported refractive index modifications to non-silica glass (Foturan®) using a femtosecond pulsed, near infrared laser ($\lambda$=775 nm). (M. Masuda et al., *SPIE Proc.* 4830, 576–80, 2002).

Figure 4:
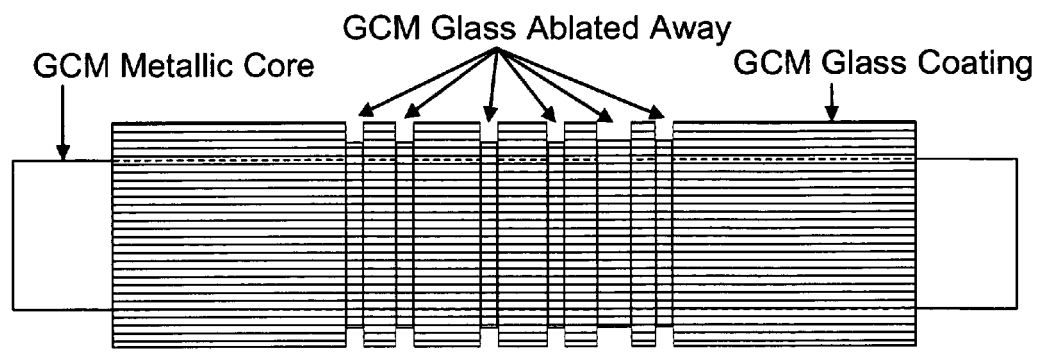
FIG. 4 is a schematic representation of GCM having discrete bands of a) selectively ablated glass coating, and b) selectively ablated glass coating and back-filled contrast coating.
Figure 4:
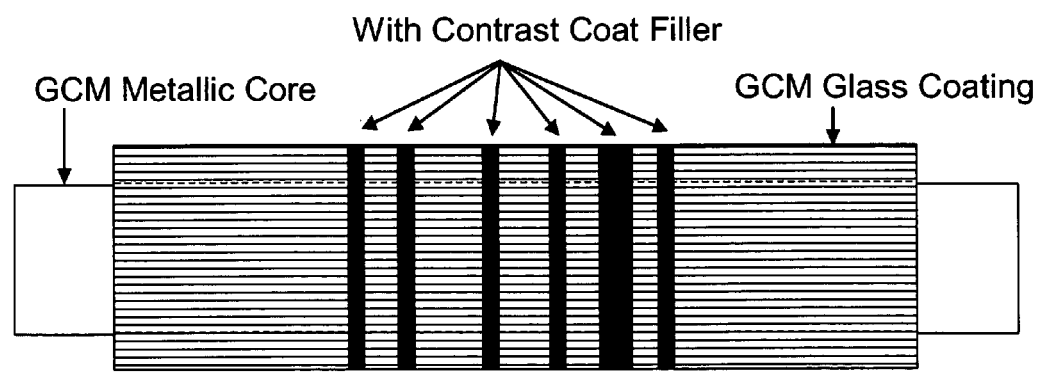

UV laser ablation (physical grating): Using a UV laser, portions of the glass coating can physically be removed from the GCM surface. [http://www.jpsalaser.com] If the procedure is properly carried out, the resulting surface structure will have a unique reflectivity when exposed to incident light, thereby providing a means for encoding information on the GCM. This technique may also be used to remove outer layers from GCM glass coating to form an optically detectable bar code, as previously described herein. Additionally, a coating could be applied to the GCM after this physical grating is formed whereby the optical contrast is enhanced, easing detection. This concept is shown schematically in FIG. 4.

Techniques Based Upon Combined Effects

Field-induced heating: The glass-alloy composite structure of GCM permits a variety of additional encoding/detection combinations. One interesting approach is to use thermal imaging of the GCM, wherein an external magnetic field is applied, causing the alloy of the GCM core to heat. Infrared measurement of the temperature rise is one detection method. Another technique would be to dope the glass with the Rare Earth element Europium, which has a highly temperature-sensitive fluorescence emission spectrum, and sense the temperature increase by observing the shift in the Europium emission peak.

Simultaneous magnetic and optical encoding: The magnetic properties of the GCM can be used to alter the detectable optical properties of the external glass coating. Certain elements, when incorporated into a glass, exhibit magneto-optical properties, whereby polarized light passing through the glass will undergo a rotation in the plane of polarization when the glass is exposed to a magnetic field. Examples of potential dopants include several elements in the Rare Earth family, which could be incorporated into the glass coating of the GCM. In addition, a separate coating, containing a magneto-optical substance, could be placed onto the outside surface of the GCM immediately after drawing. In either case, the operating principle is for the underlying magnetic domain structure of the GCM alloy core, having been magnetically encoded, to alter the polarization plane of polarized light passing through the glass coating of the GCM. Such alterations will be detectable optically, thereby providing a means of information storage that is either redundant or complimentary to magnetically stored information. Reading this type of optical encoding requires the measurement of normal (at 90° to the surface) reflectance of a polarized incident light source in each of the magnetically encoded regions, and one could envision detecting the normal reflection of a laser source as it is scanned along the GCM. Conversely, combined magnetic and optical encoding can be achieved through the application of a spatially varying, permanent magnetic film to the surface of the GCM (i.e. magnetic film or ink bar code). Such a film could be chosen such that its reflectivity contrasts sufficiently from the uncoated GCM surface to enable bar code reading. Furthermore, being a permanent magnetic material, the film will affect the Barkhausen response of the underlying alloy core of the GCM, thereby altering the magnetically detected signal.

GCM of the instant invention having an amorphous or nanocrystalline core can readily be tailored for use with an extensive variety of distinct applications through the appropriate selection of metal alloy and glass chemistries, and the control of alloy and glass dimensions. The ability to magnetically and/or optically store information in or on the microwire by multi-bit encoding/reading capabilities enables a multitude of additional applications in which information exchange is required. Among other benefits, magnetically and/or optically encoded GCM is a passive device. It requires no internal power source, with the result that device size and cost are reduced relative to non-passive devices. An additional benefit resides in the ability to store information using either or both magnetic and optical encoding. This feature allows for complimentary functionality and/or redundancy in which the reading of each encoding type can be independent. Reading of information stored either magnetically or optically can be accomplished either at close proximity or from a distance. Optical reading is a line-of-sight process, whereas magnetically stored information has the additional benefit of not being limited as a line-of-sight process. Some optical and magnetic encoding techniques must be practiced while the glass-coated amorphous or nanocrystalline microwire is manufactured. This approach provides additional benefits in those applications requiring brand authentication, security and anti-counterfeiting functionality. Other types of optical and magnetic encoding can be carried out either during GCM manufacture or at the point-of-use, thereby providing flexibility for many end-use applications. In addition, the encoding of the GCM of the instant invention provides a critical link to establishing low-cost systems wherein multi-bit information storage media is read remotely. Further advantages of encoded GCM are its small size and continuous nature, which provide the benefits of unobtrusiveness and high-speed incorporation, respectively, to certain applications. The remarkable physical properties of the GCM facilitates its incorporation as a component onto or into a vast variety of materials, including paper, paperboard, foils, corrugated papers, converted paper products, cardboard, paper laminations, plastics, polymers, and textiles, which includes yarns, threads, woven products, ribbons and the like, and combinations of these materials. Having been incorporated onto or into any of the above materials or by itself, the GCM may be used to make composite structures comprising alloys, ceramics, plastics, glasses and liquids.

Applications for the aforementioned systems include enhanced inventory control, cradle to grave tracking of livestock and related food products, designer product authentication, tracking and anti-diversion, for example cigarette products, driver's licenses, identification cards, passports, and various other documentation of import, including currency, commercial instruments and the like. Additional applications where special functionality derives from the incorporation of encoded glass-coated amorphous or nanocrystalline microwire include credit cards, retail gift/merchandise cards, smart labels and smart packaging for the retail, industrial and government markets, all forms of ticketing, for example event and transportation ticketing, identification and tracking of biomedical items and living organisms. One specific use of the combined optical and magnetic capabilities of the GCM is to facilitate retail customer self-checkout. This device combines both EAS (electronic Article Surveillance) simultaneously with the ability to optically/magnetically scan data. The low cost ease of application and combined features of EAS, inventory data management and checkout scanning make this ideal for food and grocery stores. The use of optical and magnetic capabilities of GCM will also be applied as an item level interface that will transmit and communicate information to RFID tags. GCM may also be used in the technology of smart antennas. Specifically, such GCMs find use as the on-off elements of phased array systems.

The following examples are presented to provide a more complete understanding of the invention. The specific techniques, conditions, materials, proportions and reported data set forth to illustrate the principles and practice of the invention are exemplary and should not be construed as limiting the scope of the invention.

EXAMPLE 1

Figure 5:
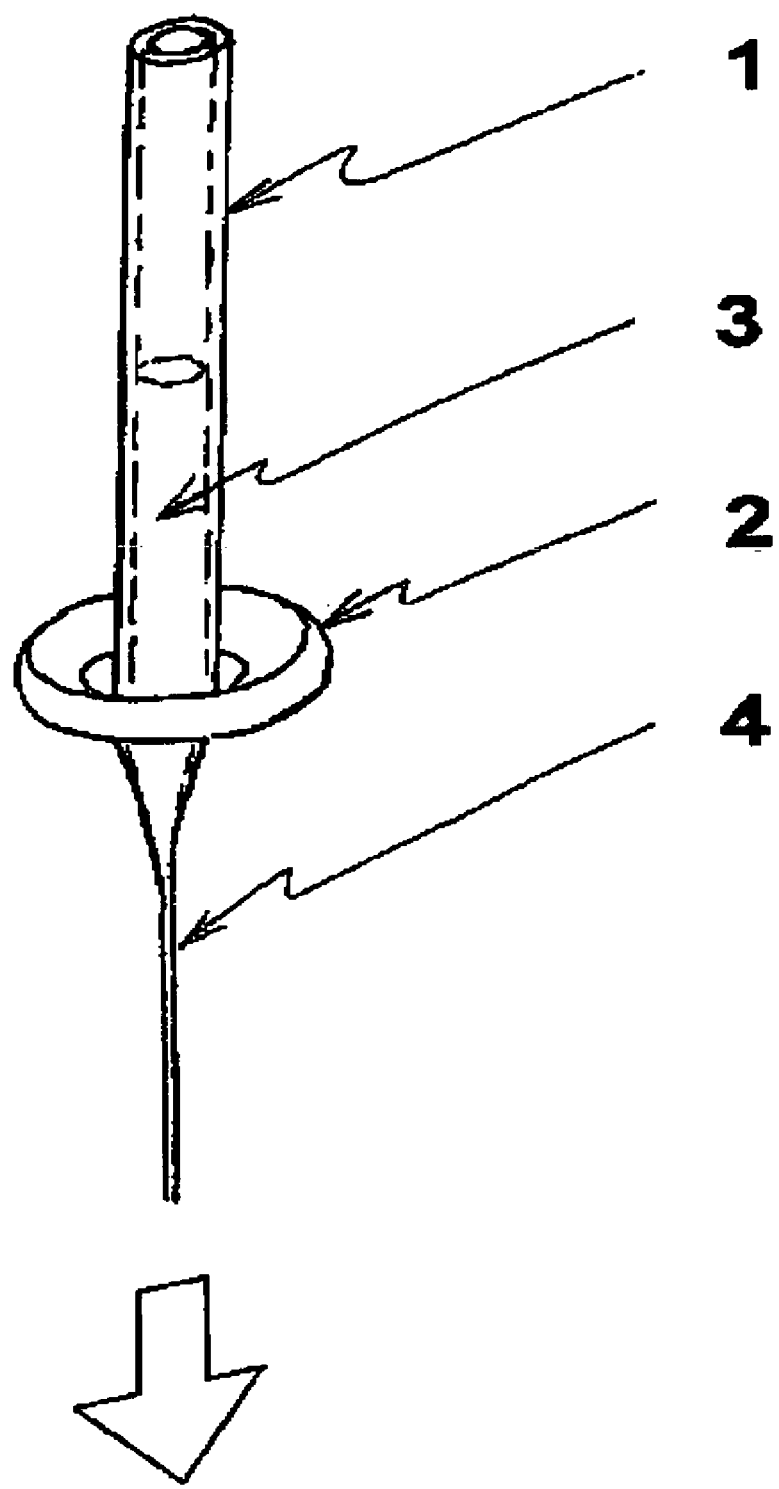
FIG. 5 is a perspective view showing a GCM produced by drawing from a round glass tube.

An ingot composed of an amorphous-forming metallic alloy is prepared by loading the appropriate weights of constituent elements into a quartz tube that is sealed at one end. The other end of this quartz tube is connected to a pressure-vacuum system to allow evacuation and back-filling with Ar gas several times to ensure a low oxygen Ar atmosphere within the quartz tube. Next, the closed end of the quartz tube in which the elements reside is introduced into a high frequency induction-heating coil. With the application of radio frequency ("r.f.") power, the elements inside the tube are caused to heat and melt into a stirred, homogeneous metallic alloy body. When the r.f. power is shut off, the alloy body is allowed to cool to room temperature in the Ar atmosphere. Once cooled, the same metallic alloy body is inserted into the bottom of a vertically disposed glass tube 1 (preform), having 6-mm diameter that is sealed at the lower end, as depicted in FIG. 5. The upper end of this preform is connected to a pressure-vacuum system to allow evacuation and back-filling with Ar gas several times to ensure a low oxygen Ar atmosphere within the quartz tube. A specially built inductor 2 at the bottom of the preform is energized with r.f. power in order to heat and then melt the metallic alloy body 3 within the tube. Once the metallic alloy body is molten and heated above its liquidus temperature by some 20 to 50° C., a solid glass rod is used to touch and bond to the bottom of the sealed glass preform in which the molten metallic alloy resides. The heat of the molten metallic alloy softens the glass preform allowing it to be drawn by pulling on the glass rod to which it is attached. Molten metallic alloy is entrained in the drawn glass capillary 4 that results. The drawn capillary is then pulled and guided onto a spinning take-up spool, which provides both winding tension to ensure continuous drawing at a rate of about 5 meters/second and a systematically wound article (microwire) package.

Figure 6:
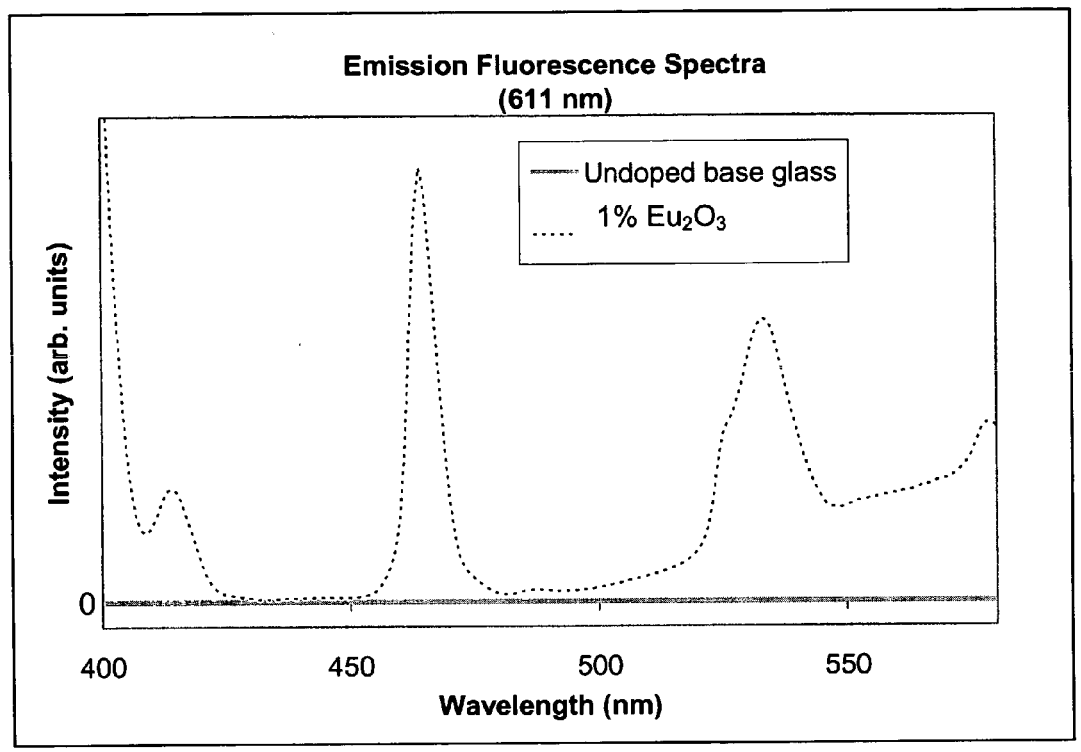
FIG. 6 shows optical emission spectra of an alkali borosilicate base glass and of the same base glass doped with 1 mole % of Europium in the form of $Eu_2O_3$.

Amorphous glass-coated microwire about 30 μm in diameter is produced using the procedure described above. The microwire has an $Fe_{77.5}B_{15}Si_{7.5}$ amorphous alloy core that is under axial tensile stress. The glass from which the preform was made, and which coats the microwire, is similar to a commercially available alkali borosilicate glass (PYREX®) composition, having optical properties as shown in FIG. 6. The use of this basic glass in making the GCM does not afford any outstanding, intense optical behaviors that might be exploited for optical authentication or encoding purposes.

EXAMPLE 2

GCM for use in optical-based authentication is produced using the methods, materials and apparatuses of Example 1, except that the borosilicate composition used to form the glass coating of the GCM now contains a small amount of the rare earth element Europium (Eu). The incorporation of Eu into the glass composition results in the optical behavior shown in FIG. 6, wherein the detectable emission of light at 611 nm occurs when the glass is illuminated by broadband light having wavelengths between 420–600 nm. Note the dramatically increased output signal from the glass of this example, when compared to that of Example 1. Furthermore, the sensitive effect of Eu concentration on the resultant emission strength is shown thereby, providing a complementary means for providing authentication.

EXAMPLE 3

Figure 7:
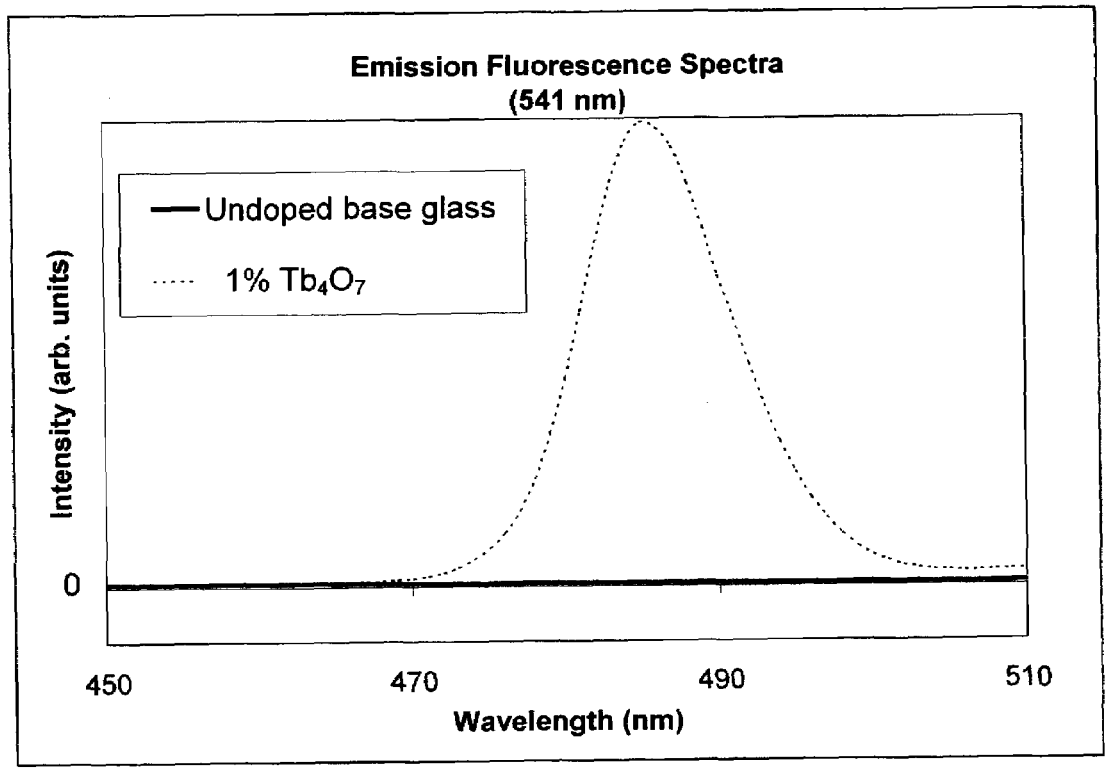
FIG. 7 shows optical emission spectra of an alkali borosilicate base glass of the same base glass doped with 1 mole % of Terbium in the form $Tb_4O_7$.

GCM for use in optical-based authentication is produced using the methods, materials and apparatuses of Example 1, except that the borosilicate composition used to form the glass coating on the GCM now contains a small portion of any one of the rare earth elements: Cerium (Ce), Praseodymium (Pr), Neodymium (Nd), Samarium (Sm), Europium (Eu), Gadolinium (Gd), Terbium (Tb), Dysprosium (Dy), Holmium (Ho), Erbium (Er), Thulium (Tm), Ytterbium (Yb), and Lutetium (Lu). Each individual rare earth element lends its own unique contribution to the host glass' intrinsic optical signature, which can then be exploited for authentication purposes. As for the Eu in Example 2, the unique optical signature due to the rare earth component is a function of the concentration. FIG. 7 shows optical emission spectra of an alkali borosilicate base glass of the same base glass doped with 1 mole % of Terbium in the form $Tb_4O_7$. Note how output increases rapidly with the addition of $Tb_4O_7$.

EXAMPLE 4

Figure 8:
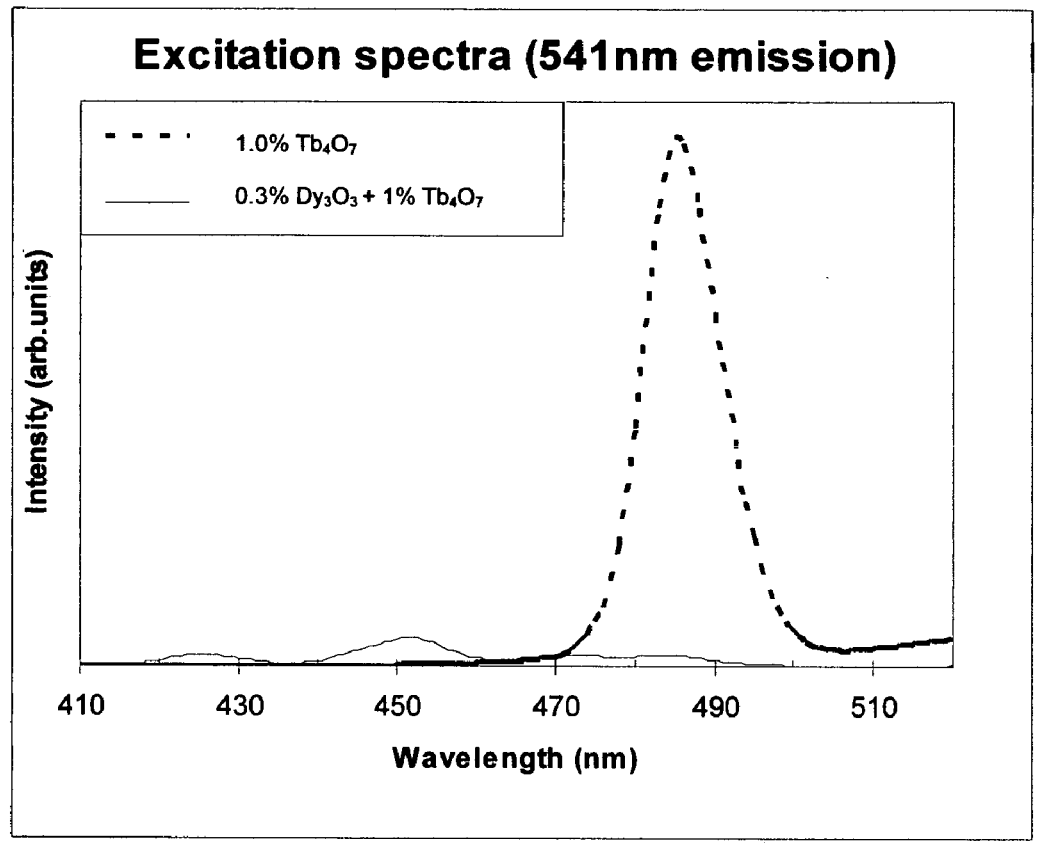
FIG. 8 shows optical emission spectra of an alkali borosilicate glass with the addition of various amounts of Terbium in the form $Tb_4O_7$ as well as $Dy_2O_3$.

GCM for use in optical-based authentication is produced using the methods, materials and apparatuses of Examples, except that the borosilicate composition used to form the glass coating on the GCM now contains a small portion of two or more of the rare earth elements: Cerium (Ce), Praseodymium (Pr), Neodymium (Nd), Samarium (Sm), Europium (Eu), Gadolinium (Gd), Terbium (Th), Dysprosium (Dy), Holmium (Ho), Erbium (Er), Thulium (Tm), Ytterbium (Yb), and Lutetium (Lu). Each individual rare earth element lends its own unique contribution to the host glass' optical signature, allowing one skilled in the art to construct an infinite variety of unique optical signatures through various combinations of rare earths at different concentrations. In addition, certain synergistic optical effects can be obtained through direct interaction between different rare earth components. FIG. 8 illustrates an example to the interactive output resulting from having both $Tb_4O_7$ and $Dy_3O_3$ present as small amounts in the base alkali borosilicate glass. It is the overall unique and controllable optical signature, with virtually an infinite number of predetermined combinations, which is then utilized for authentication purposes.

EXAMPLE 5

GCM for use in optical-based authentication is produced using the methods, materials and apparatuses of Examples 1, except that the glass composition used to form the glass coating on the GCM and which contains a small portion of one or more of the rare earth elements (Ce, Pr, Nd, Sm, Eu, Gd, Th, Dy, Ho, Er, Tm, Yb and Lu), is not limited to the borosilicate family. Rather, the glass used to produce the GCM and which acts as the host matrix for the rare earth elements can be any composition possessing the physical, thermal and chemical properties consistent with microwire production (Liebermjann et. al., U.S. patent application Ser. No. 10/746,784, filed: Dec. 26, 2003.) Regardless of the glass host, each individual rare earth element lends its own unique contribution to the host glass' intrinsic optical signature, which can then be exploited for authentication purposes.

EXAMPLE 6

GCM for use in optical-based authentication is produced using the methods, materials and apparatuses of Example 1, wherein a film or coating, having a specific and detectable optical nature, preferably different from the GCM surface, is applied to the drawn microwire. This coating can be a polymer, metal, and ceramic and can be coated onto the microwire using any method, including but not limited to vapor deposition, dip coating, and laser direct writing.

One variant is to coat the GCM during its drawing by passing it through a bath of molten aluminum that will coat the external glass surface.

A second variant involves printing a specifically-colored coating onto the GCM using a high speed ink printer, as it is currently done with electrical wire. In this case, the ink must be cured by exposing the GCM to a high intensity UV light source. The intensity required is a function of the ink, its thickness, and the GCM drawing speed. The printed and cured pattern can then provide the basis for optical identification. Further variants involve a coating/ink that must be cured using one or more of the following: heat, oxidation, laser or electron beam radiation, and ultrasonic energy.

A further variant involves dip-coating the GCM through a sol-gel solution containing any of a number of fluorescent or specially colored pigments. The coated GCM is then passed through an oven heated to a temperature sufficient to cure the sol-gel coating, given the composition and GCM drawing rate. The special color properties imparted to the GCM by the sol-gel coating then become the basis for optical authentication.

Yet another variant involves the vapor deposition of a metallic film onto the outside surface of the GCM via sputtering, also known as physical vapor deposition. In this case, the metal to be coated onto the GCM is first fashioned into a "target", which when impacted by ionized argon gas molecules, will contribute ejected atoms from its surface. The ejected or "sputtered" atoms will travel to and bond with the intended substrate, in our example the GCM, thereby forming the film. Metallic films obtainable using this method may include any of the following elements constituting from 0% to 100% of the film: B, C, Na, Mg, Al, Si, P, S, Ca, Sc, Ti, V, Cr, Mn, Fe, Co, Ni, Cu, Zn, Ga, Ge, As, Se, Sr, Y, Zr, Nb, Mo Ru, Th, Pd, Ag, Cd, In Sn, Sb, Te, Ba, La, Hf, Ta, W, Re, Os, Ir, Pr, Au, Tl, Pb, Bi.

Methods practiced in conjunction with the previous variant include other vapor deposition methods, including chemical vapor deposition (CVD), thermal evaporation deposition, electron beam evaporation deposition, plasma vapor deposition, plasma-assisted CVD, atomic layer deposition (ALD), laser-assisted vapor deposition, and the like.

Structures associated with the practice of the previous two variants include non-metallic films formed on the GCM using any of the vapor deposition-based techniques available and appropriate for a given film composition.

EXAMPLE 7

GCM for use in optical-based authentication is produced using the methods, materials and apparatuses of Examples 1, wherein a film or coating, having a specific and detectable optical nature, different from that of the GCM surface, is applied to the drawn GCM, thereby forming an optically readable bar code. The means for defining and forming this optical bar code include but are not limited to the following variants:

Masking—Specified regions of the GCM are masked prior to film deposition. After deposition, the mask elements are removed, exposing the uncoated GCM surface. For example, one could form a pattern using balsam wax on the GCM immediately prior to coating with a sol-gel. At temperatures well below that used to cure the sol-gel, the wax will melt, thereby being removed from the GCM and taking the uncured sol-gel coating with it from those specified regions. A predetermined and well-defined, optically readable pattern results.

Selective removal: One variant is to coat the GCM during its drawing by passing it through a bath of molten aluminum that will coat glass fibers. A commercially available UV laser, used for precision machining and operating at a wavelength of 157 nm, can then be used to remove the aluminum coating in selected regions, thereby forming an optically detectable bar code on the surface of the GCM. One skilled in the art could envision achieving this result by employing any of a number of metal, non-metal, ceramic and plastic materials to form the film using any one of a variety of deposition methods, while the selective removal is done using any of a number of lasers in the UV, Visible and Infrared portions of the spectrum. A further example of this scenario would be to coat the GCM with a UV-curable ink, then pass the GCM through a UV source where a well-defined mask, having a pattern of slits, is held between the GCM and the UV light source. After this selective curing, the GCM is passed through a rinse station, where the uncured ink is removed, leaving the intended, permanent pattern. Optionally, a UV laser source effects curing of intended regions, leaving other ink-covered regions uncured and subject to removal during the rinse step. The cured ink regions provide the basis for optical identification/reading.

Selective deposition/patterning—One example involves the printing of specifically-colored rings onto the GCM using a high speed ink printer, as it is currently done with many products including electrical wire and food containers. In this case, the ink rings would then be cured by exposure to a high intensity light source, an electron beam, radiant heat, an oxidizing atmosphere, or an ultrasonic environment. The curing methodology required is a function of ink chemical composition, its thickness, GCM drawing speed, and the desired form of the pattern. The printed and cured pattern can then provide the basis for optical identification. Another example of this type involves the use of a laser direct write method. In this case, the material to be deposited is lightly bonded to one side of a sheet of transparent material, typically a polymer film. A pulsed laser source, to which the sheet material is transparent and the deposition material is not, is directed to be incident upon the uncoated side of the sheet, which is situated between the pulsed laser and the GCM to be patterned. As the laser is pulsed, the coating material is ejected from the backside of the sheet and onto the GCM. Both the sheet and the GCM substrate are moved, such that the pulsed laser beam strikes a new spot on the sheet with each pulse, and the desired pattern is formed on the GCM using the ejected coating material. After the pattern is deposited, the coated GCM is then subjected to a heat treatment appropriate to cure the patterned coating material. The result is an optically readable pattern on the GCM.

EXAMPLE 8

GCM for use in optical-based authentication is produced using the methods, materials and apparatuses of Example 1, wherein a readable optical bar code is created by ablation methods. Ablated regions have a greater surface roughness compared to the as-formed GCM glass surface, which is very smooth. The surface roughness in turn alters the reflection of incident light back to a detection device, thereby providing the means for optical discrimination between the ablated and unablated regions (i.e. optical reading). Hereunder are disclosed some ablation methods that include but are not limited to the following variants:

Borofloat™ glass (Corning 7740) is ablated using a Ti:sapphire laser ($\lambda$=780–800 nm) operating with femtosecond pulses (100–200 fs). By focusing the laser using a long working distance objective lens, a small spot size is situated onto the target surface. The ablated volume (i.e. removal thickness) is controlled by varying the number of laser pulses incident upon a given region. Further, by passing the laser through a diffractive grating or mask, a specific pattern can be ablated into the GCM glass surface (Adela Ben-Yakar et al., Applied Physics Letters 83, No. 15, 3030–32 (2003)).

Another example involves the use of lasers operating in the ultraviolet spectral region (UV) to ablate glasses. Pulsed UV lasers (10 ns.), operating at 157 nm and 266 nm, are used to machine fused silica, soda lime silica and zinc borosilicate glasses. (Michael Argument et al., Photons 1, No. 2, 15–17 (2004)).

Yet another example is demonstrated by the commercial usage of excimer UV lasers operating at 193, 248, 308 and 351 nm wavelengths to micro-machine and mark ceramic and inorganic glass materials (http://www.resonetics.com/).

Finally, lasers operating in the infrared spectral region are also used commercially to mark and machine ceramics and glasses. $CO_2$ lasers, operating at a wavelength of 10.6 µm are used for this purpose (http://www.resonetics.com/).

EXAMPLE 9

GCM for use in optical-based authentication is produced using the methods, materials and apparatuses of Examples 8, wherein a readable optical bar code is enhanced by methods that involve the application of select substances to the GCM in the formerly ablated regions, which will in turn alter the optically reflective properties (e.g. color or reflectance) of those regions. The application of an ink or coating to the GCM, followed by a wiping step, which removes the ink from the unablated GCM surfaces preferentially, leaves the ink remaining in the previously ablated regions. The composition of the ink can be designed to impart a color to the previously ablated regions. One example is an ink or coating containing fluorescent pigments that strongly reflect at specific wavelengths when subjected to UV illumination. Another example is a black ink, the reflection from which will be easily discernible from the shiny, unablated, uncoated GCM glass surface. In both of these cases, the increased optical contrast between the formerly ablated, coated regions and the unablated, uncoated regions provides the means to enable optical reading. The ink or coating can contain particles having specific optical or magnetic properties. One example is an ink containing BASF 025 or BASF 340 magnetic pigments, which contain magnetizable iron and iron oxide particles, respectively. Such pigments provide an enhanced optical contrast between previously ablated and unablated regions, as well as providing an external magnetic bias field that will interact with the intrinsic magnetic domain structure of the GCM, thereby altering the electromagnetic signal of the GCM.

Having thus described the invention in rather full detail, it will be understood that such detail need not be strictly adhered to but that various changes and modifications may suggest themselves to one skilled in the art, all falling within the scope of the present invention as defined by the subjoined claims.

What is claimed is:

1. In a metallic glass-coated microwire having a metallic alloy core and a glass coating, the improvement wherein:
   a. said glass coating and said metallic alloy core have a thermal contraction coefficient differential, said thermal contraction coefficient of said glass coating being less than that of said metallic alloy core;
   b. said thermal contraction coefficient differential has a predetermined value large enough that said glass is placed under residual compression, interfacial bonding between said glass and said metallic alloy core is substantially uniform, and surface cracking and bond breaks between said metallic alloy core and said glass are substantially prevented; and c. said glass-coated microwire has discrete circumferential bands or other zones that are comprised of a glass having a composition different from that of the coating glass.

2. A metallic glass-coated microwire as recited by claim 1, in which said glass coating contains an oxide component and at least one rare earth element, present in a predetermined amount ranging from 0 mole percent to 5 mole percent of said oxide component.

3. A metallic glass-coated microwire as recited by claim 2, in which said glass coating contains at least two rare earth elements, present in a combined amount ranging from 0 mole percent to 5 mole percent of said oxide component.

4. A metallic glass-coated microwire as recited by claim 1, in which said microwire comprises a layer that has a magnetic code atop the coating glass.

5. A metallic glass-coated microwire as recited by claim 1 that has ablation bands or zones that result from the localized ablation away of a predetermined amount of the coating glass.

6. A metallic glass-coated microwire as recited by claim 5 wherein said ablation bands or zones are back-filled with a substance other than that used as the coating glass.

7. An article of manufacture having integrally associated therewith a metallic glass-coated microwire as recited by claim 1.

8. In a metallic glass-coated microwire having a metallic alloy core and a glass coating, the improvement wherein:

a. said glass coating and said metallic alloy core have a thermal contraction coefficient differential, said thermal contraction coefficient of said glass coating being less than that of said metallic alloy core;

b. said thermal contraction coefficient differential has a predetermined value large enough that said glass is placed under residual compression, interfacial bonding between said glass and said wire is substantially uniform, and surface cracking and bond breaks between metal and glass are substantially prevented;

c. said glass-coated microwire has discrete circumferential bands or other zones that result from the localized ablation away of a predetermined amount of the coating glass and are comprised of a magnetic material.

9. A metallic glass-coated microwire as recited by claim 8 wherein said bands or zones are back-filled with a substance other than that used as the coating glass.

10. An article of manufacture having integrally associated therewith a metallic glass-coated microwire as recited by claim 8.

* * * * *